(12) United States Patent
Didcock et al.

(10) Patent No.: US 9,110,892 B2
(45) Date of Patent: Aug. 18, 2015

(54) SYNCHRONIZING LOCAL AND REMOTE DATA

(75) Inventors: Clifford Neil Didcock, Sammamish, WA (US); Jonathan M. Luk, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 13/418,356

(22) Filed: Mar. 13, 2012

(65) Prior Publication Data

US 2013/0246353 A1     Sep. 19, 2013

(51) Int. Cl.
  *G06F 7/00* (2006.01)
  *G06F 17/30* (2006.01)
  *H04L 29/08* (2006.01)

(52) U.S. Cl.
  CPC .......... *G06F 17/30* (2013.01); *G06F 17/30575* (2013.01); *H04L 67/1095* (2013.01); *H04L 67/2852* (2013.01)

(58) Field of Classification Search
  CPC ............ G06F 11/1658; G06F 11/1662; G06F 11/2074; G06F 11/2082; G06F 15/7825; G06F 17/30174; G06F 17/30176; G06F 17/30575; G06F 17/30581; G06F 2221/0793
  USPC ............................ 707/610, 635, 620, 999.204
  See application file for complete search history.

(56) References Cited

U.S. PATENT DOCUMENTS

| | | | |
|---|---|---|---|
| 6,202,085 B1 * | 3/2001 | Benson et al. ................ | 709/205 |
| 6,324,544 B1 * | 11/2001 | Alam et al. ........................ | 1/1 |
| 8,046,424 B2 | 10/2011 | Novik et al. | |
| 8,510,267 B2 * | 8/2013 | Barton et al. ................ | 707/620 |
| 2003/0097381 A1 * | 5/2003 | Detweiler et al. ............ | 707/201 |
| 2004/0010523 A1 * | 1/2004 | Wu et al. ........................ | 707/203 |
| 2004/0068523 A1 * | 4/2004 | Keith et al. .................... | 707/200 |
| 2006/0173959 A1 | 8/2006 | McKelvie et al. | |
| 2006/0277224 A1 * | 12/2006 | Aftab et al. .................... | 707/201 |
| 2009/0198835 A1 * | 8/2009 | Madhusudanan et al. .... | 709/248 |
| 2009/0300169 A1 | 12/2009 | Sagar et al. | |
| 2011/0072427 A1 | 3/2011 | Garmark | |
| 2011/0208695 A1 * | 8/2011 | Anand et al. .................. | 707/610 |
| 2011/0264621 A1 | 10/2011 | Burjoski | |
| 2011/0264748 A1 * | 10/2011 | Pouzin et al. ................. | 709/206 |
| 2011/0295796 A1 * | 12/2011 | Muhunthan et al. .......... | 707/610 |
| 2012/0117026 A1 * | 5/2012 | Cassidy ........................ | 707/634 |
| 2012/0117271 A1 * | 5/2012 | Kennedy et al. .............. | 709/248 |

(Continued)

OTHER PUBLICATIONS

"UserPilot: Integrating Hosted and On-Premise Active Directory", Retrieved at <<http://pinpoint.microsoft.com/en-us/applications/userpilot-integrating-hosted-and-on-premise-active-directory-4294981079>>, Retrieved Date: Dec. 22, 2011, pp. 2.

(Continued)

*Primary Examiner* — Mohammed R Uddin
(74) *Attorney, Agent, or Firm* — Ben Tabor; Kate Drakos; Micky Minhas (57) ABSTRACT

Aspects of the subject matter described herein relate to synchronizing data. In aspects, properties are synchronized from an organization property store to a cloud property store and/or vice versa. The list of properties to synchronize may change based on the cloud services to which the organization subscribes, changes to the cloud services, or for other reasons. Furthermore, the list of properties to synchronize may be limited to certain objects of the organization which may also change over time.

20 Claims, 5 Drawing Sheets

(56) References Cited

U.S. PATENT DOCUMENTS

| | | | |
|---|---|---|---|
| 2012/0137003 A1* | 5/2012 | Ferris et al. | 709/226 |
| 2012/0209909 A1* | 8/2012 | Huang et al. | 709/204 |
| 2012/0221454 A1* | 8/2012 | Morgan | 705/37 |
| 2013/0084828 A1* | 4/2013 | Forte | 455/410 |
| 2013/0173533 A1* | 7/2013 | Nichols | 707/609 |
| 2013/0185258 A1* | 7/2013 | Bestler et al. | 707/638 |

OTHER PUBLICATIONS

"Information regarding Microsoft's Directory Synchronization (DirSync)", Retrieved at <<http://intercall.custhelp.com/app/answers/detail/a_id/1000/~/information-regarding-microsoft's-directory-synchronization-(dirsync)>>, Mar. 8, 2011, p. 1.

Luk, Jono, "Microsoft Office 365: Directory Synchronization", Retrieved at <<http://www.google.co.in/url?sa=t&rct=j&q=on-premise+directory+synchronization+with+cloud&source=web&cd=2&ved=0CC4QFjAB&url=http%3A%2F%2Fmedia.ch9.ms%2Fteched%2Fna%2F2011%2Fppt%2FOSP325.pptx&ei=gbvyTr63OMOJrAfcrrHtDw&usg=AFQjCNEx71FyYD8iw3goUYjbe88ubnmyOg&sig2=Dbm_eUfwGxZXZ8KufPNpwA>>, Microsoft Teched, May 16-19, 2011, pp. 42.

"Using the Microsoft Sync Framework Metadata Storage Services", Retrieved at <<http://msdn.microsoft.com/en-us/sync/bb891780>>, Oct. 2009, pp. 6.

"About Directory Synchronization", Retrieved at <<http://technet.microsoft.com/en-us/library/cc742628.aspx>>, Retrieved Date: Dec. 22, 2011, pp. 2.

"LotusLive Notes Full-Featured e-mail, Calendar & Contact Management", Retrieved at <<https://www.lotuslive.com/en/services/page.php?id=notes&tab=hybrid>>, Retrieved Date: Dec. 22, 2011, pp. 2.

"International Search Report", Mailed Date: May 30, 2013, Application No. PCT/US2013/027546, Filed Date: Feb. 25, 2013, pp. 9.

* cited by examiner

SYNCHRONIZING LOCAL AND REMOTE DATA

BACKGROUND

Applications and other computing resources for an organization may be located on the premises of the organization and/or in the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources. Problems arise in environments where some resources for an organization are provided from the cloud and some are provided by servers located on the premises of the organization.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to synchronizing data. In aspects, properties are synchronized from an organization property store to a cloud property store and/or vice versa. The list of properties to synchronize may change based on the cloud services to which the organization subscribes, changes to the cloud services, or for other reasons. Furthermore, the list of properties to synchronize may be limited to certain objects of the organization which may also change over time.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
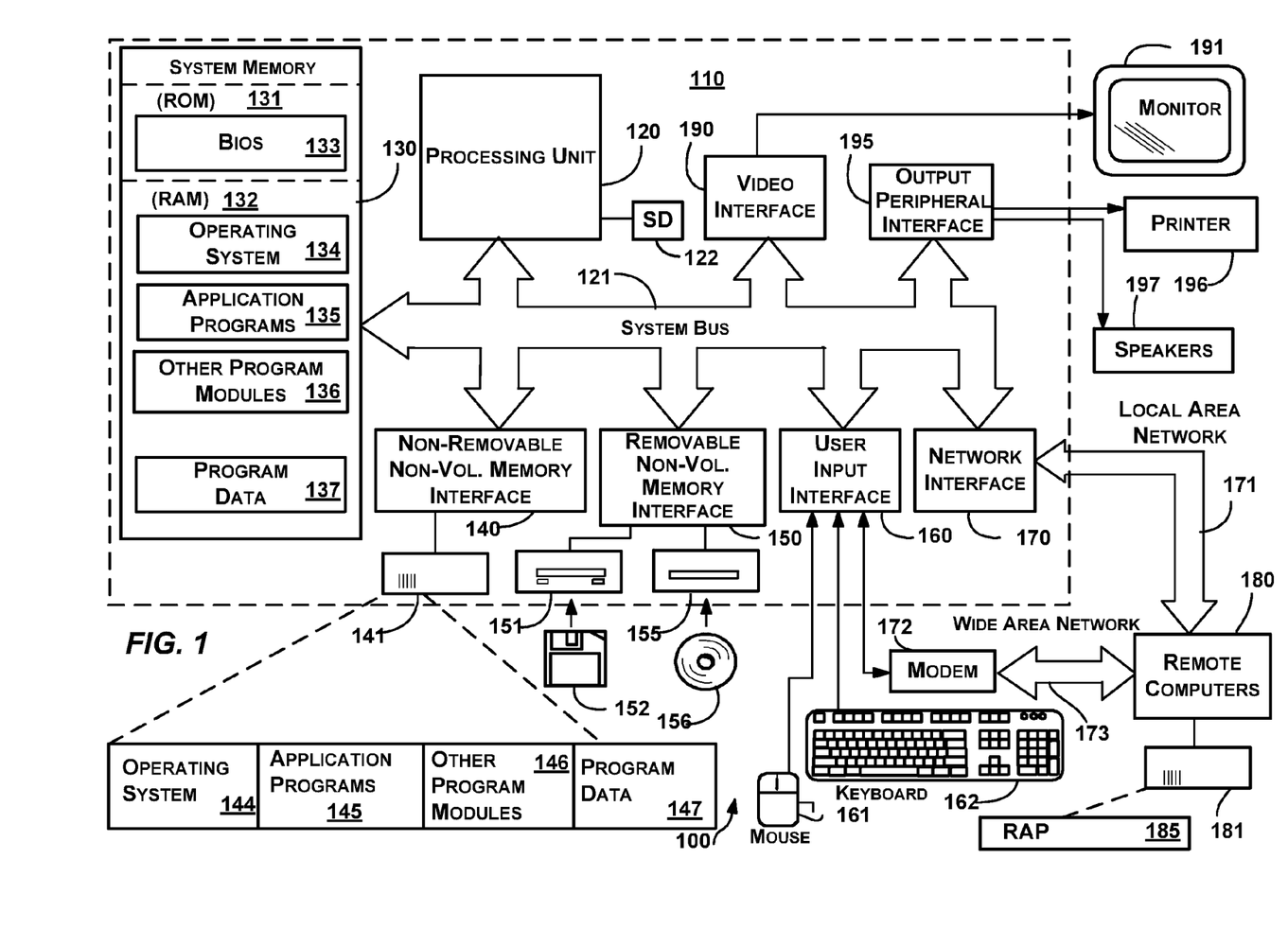
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Synchronization

As mentioned previously, computing resources for an organization may be located on the premises of the organization and/or in the cloud. In a hybrid model where an organization chooses to provide some of its own computing services locally and to obtain other computing services from the cloud, to properly function, the cloud may need or operate more effectively if it has a copy of the data that resides within the computing resources of the organization.

Figure 2:
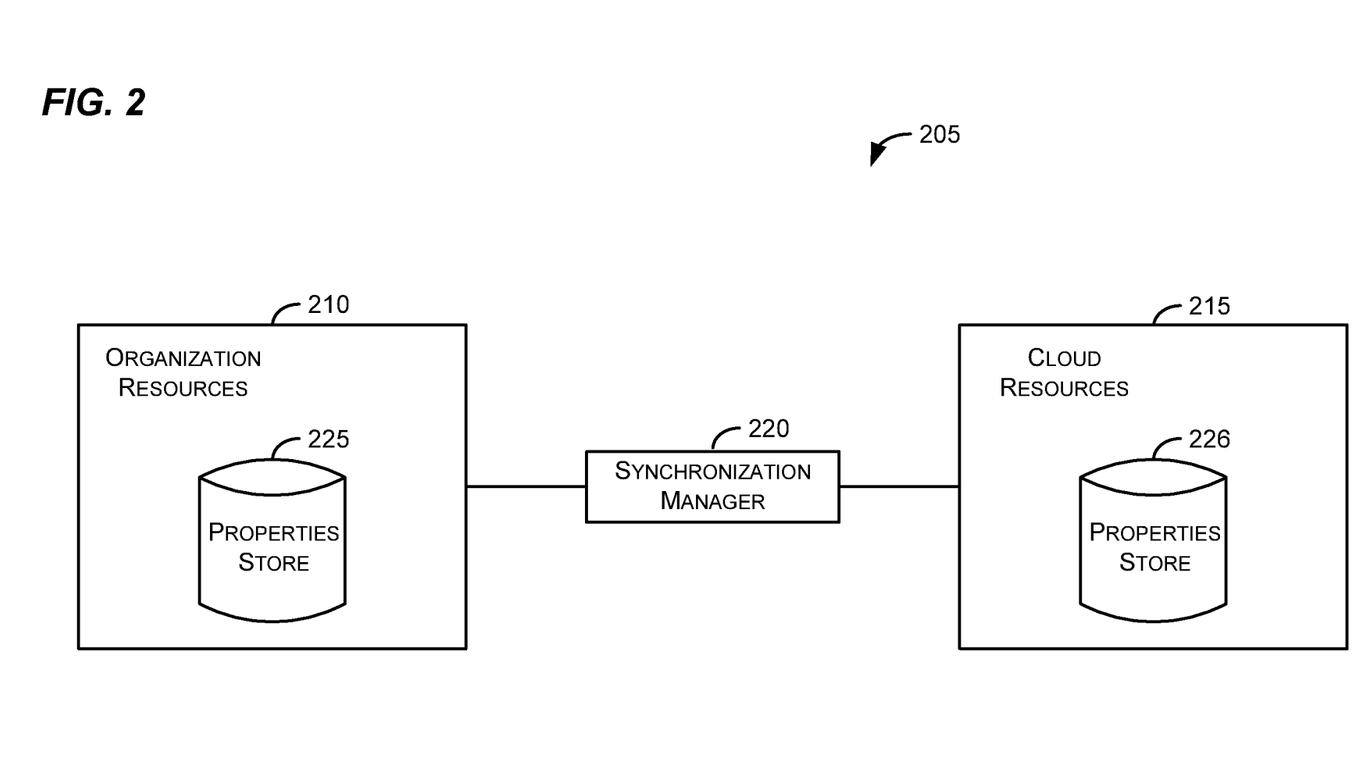
FIG. 2 is a block diagram that represents an exemplary environment in which aspects of the subject matter described herein may operate.

FIG. 2 is a block diagram that represents an exemplary environment in which aspects of the subject matter described herein may operate. The entities illustrated in FIG. 2 are exemplary and are not meant to be all-inclusive of entities that may be needed or included. In other embodiments, the entities and/or functions described in conjunction with FIG. 2 may be included in other entities (shown or not shown) or placed in sub entities without departing from the spirit or scope of aspects of the subject matter described herein. In some embodiments, the entities and/or functions described in conjunction with FIG. 2 may be distributed across multiple devices.

The system 205 may include organization resources 210, cloud resources 215, a synchronization manager 220, and other entities (not shown). As used herein, the term entity is to be read to include all or a portion of one or more devices, a collection of one or more software modules or portions thereof, some combination of one or more software modules or portions thereof and one or more devices or portions thereof, and the like.

The organization resources 210 may include computing resources that an organization has in its direct control. These resources may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

The cloud resources 215 may include computing resources that are available to the organization via the cloud. The cloud resources 215 may also include one or more personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

The cloud resources 215 may provide one or more services. A service may include one or more processes, threads, components, libraries, and the like that perform a designated task. Some exemplary services include e-mail, document management, reporting, database, calculating, calendaring, scheduling, instant messaging, The properties store 225 and the properties store 226 may include any storage capable of providing access to data. Access as used herein may include reading data, writing data, deleting data, updating data, a combination including two or more of the above, and the like. The stores 225 and 226 may comprise hard disk storage, other non-volatile storage, volatile memory such as RAM, other storage, some combination of the above, and the like and may be distributed across multiple devices. The store 2225 and 226 may be external, internal, or include components that are both internal and external to the system 205.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like. In one implementation, data is structured and labeled with a name.

Properties are pieces of data that are associated with or included in objects. An object as used herein may include one or more data elements. These data elements are sometime referred to as properties. For example, a user object may have a name property, an address property, a telephone property, an e-mail address property, a manager property, and so forth.

Objects may be defined by object classes. An object class may, for example, indicate an object name and one or more property types of the object class. Instantiated objects of the object class may include or be associated with properties of the one or more property types of the object class. Some exemplary object types include users, groups, contacts, machines, and the like. These types are given only as examples as it will be recognized by those skilled in the art that all or almost all entities may be defined by object classes. Based on the teachings herein, those skilled in the art will recognize many object classes to which the teachings herein may be applied without departing from the spirit or scope of aspects of the subject matter described herein.

The properties store 225 may include data of an organization. For example, the properties store 225 may include employee data, payroll data, expense data, e-mail data, accounting data, organization hierarchy data, supervisory sign off data, sign off limits, licensing data, metadata, any other data an organization may maintain, and the like. This data may be stored in a variety of places within the organization. The properties store 225 may include the data, reference the data, or obtain the data from the places the organization stores the data.

The properties store 226 may include data that has been provided to the cloud resources 215 from one or more organizations. This data may be used to provide certain services to entities of the organizations. For example, e-mail data may allow a member of an organization using an e-mail service hosted in the cloud to compose, send, and receive e-mail and to lookup contacts for the organization. As another example, cost center data may allow an accounting service to provide an expense report that reflects cost centers for various expenses of an organization.

The properties store 225 and the properties store 226 may represent the same properties in different ways. For example, the properties store 225 may represent properties via data in a file while the properties store 226 may represent those same properties in a table of a database.

The synchronizing manager 220 is an entity that synchronizes data between the properties store 225 and the properties store 226. In one embodiment, the synchronizing manager 220 may be hosted on a device of the organization. In another embodiment, the synchronizing manager 220 may be hosted on the computing resources of the cloud. In another embodiment, the synchronization manager 220 may be hosted on a device external to both the systems that host the organization resources 210 and the cloud resources 215. In another embodiment, the synchronizing manager 220 may be distributed such that it includes components that execute on devices of the organization as well as components that execute on devices of the cloud.

Although herein it is often mentioned that the synchronizing manager 220 synchronizes data between the properties store 225 and the properties store 226 by sending data from the properties store 225 to the properties store 226, in other implementations, the properties may be mastered in the properties store 226 and synchronized to the properties store 225. In yet other implementations, some properties may be mastered in the properties store 225 and synchronized to the properties store 226 while other properties may be mastered in the properties store 226 and synchronized to the properties store 225.

Periodically or at other times, the synchronizing manager 220 may synchronize data between properties store 225 and the properties store 226. To determine data that needs to be synchronized, the synchronizing manager may check certain conditions. For example, once every hour, the synchronizing manager 220 may check to see:

1. If the set of properties needed by the cloud resources has changed;

2. If the set of objects for which properties are needed has changed; and

3. If the actual data representing the properties has changed on the properties store 225.

The actions the synchronizing manager 220 may take in response to finding the above-mentioned conditions are as follows:

1. If the set of properties needed by the cloud resources has changed. Each service provided by the cloud to an organization may need one or more properties. For example, a payroll service may need the name, address, government identifier, salary amount, and other properties in order to properly pay employees of the organization. An e-mail service may need name, phone number, e-mail address, and other properties. If an organization has both payroll and e-mail services through the cloud, the set of properties needed may be determined by application of the logical OR operator of the properties needed by each service. With the above example, the logical OR operator would include name, address, government identifier, salary amount, phone number, e-mail address, and any other properties needed by the two services. Using this same methodology, the set of properties needed may be determined for any number of services.

Thus, if an organization has subscribed to another service of the cloud and the service needs a property that is not already included in the set of properties currently needed, the property is added to the set of properties needed.

Likewise, if an organization has un-subscribed to a service of the cloud, any properties needed by the un-subscribed service that are not needed by any other service to which the organization is subscribed may be removed from the set of properties needed.

If the set of properties needed by the cloud resources has changed, properties may have been added and/or removed from the set of properties needed. For properties that have been removed, the synchronizing manager 220 may instruct the cloud resources 215 to delete previously obtained data of the properties that have been removed from the set.

For properties that have been added, the synchronization manager 220 may obtain corresponding data from the properties store 225 and cause this data to be stored in the properties store 226.

In one embodiment, the synchronization manager 220 may determine if the set of properties needed by the cloud resources 215 has changed by communicating with a component within the cloud resources 215 and obtaining the set of properties needed by the cloud resources 215. The synchronization manager 220 may then compare this set of properties with the previous set of properties needed and determine what properties have been added, if any, and what properties have been deleted, if any.

The cloud resources 215 may store data in a database, file, or other data structure that indicates the properties needed for each service. The cloud resources 215 may also store data that indicates the services to which each organization has subscribed. To determine the properties needed from each organization, a component of the cloud resources 215 may join the data that indicates the service(s) to which each organization has subscribed to the data that indicates the properties needed for each service.

2. If the set of objects for which properties are needed has changed. The cloud resources 215 may need properties for only selected objects of the properties store 225. For example, the organization may have licenses for a certain users using a calendar service. The calendar service may need name, phone number, office location, and other properties, but only for users who are subscribed to the calendar service. Instead of synchronizing properties of all users of the organization, the synchronization manager 220 may just synchronize properties for users who are subscribed to the calendar service.

Although the example above describes objects of a user object class, there is no intention to limit aspects of the subject matter described herein to user object classes only. Indeed, based on the teachings herein, those skilled in the art will recognized other types of object classes to which the teachings herein may be applied without departing from the spirit or scope of aspects of the subject matter described herein.

The set of objects needed may change for various reasons. For example, if machines have been added to an organization, properties of the machine objects may need to be synchronized from the properties store 225 to the properties store 226.

As another example, the set of objects needed may change in response to changes in subscription to a service. For example, if an organization subscribed to a new service, the new service may need properties from certain object types of the organization.

The set of objects needed of a class may be limited to a subset of the total instantiated objects available of the class. For example, a service in the cloud may only need properties of objects of class machine that serve as directory servers for an organization. As another example, a service in the cloud may only need properties for certain objects of an employee class.

If objects have been added to the set of objects, properties for the added objects may be obtained from the properties store 225 and stored in the properties store 226. If objects have been deleted from the set of objects, properties already stored on the properties store 226 for which objects have been deleted from the set of objects may also be deleted from the properties store 226.

3. If the actual data representing the properties has changed on the properties store 225. For example, if an employee telephone number has changed or an address has changed, the synchronization manager 220 may propagate this change to the properties store 226. To conserve bandwidth, in one implementation, instead of sending all the data each time, the synchronization manager 220 may send changes that have occurred from the last time the synchronization manager 220 performed synchronization.

If a property is needed that does not exist on the properties store 225, this may be handled depending on implementation. For example, in one implementation, the synchronization manager 220 may inform a component of the organization resources 210 of the deficiency and allow the component to supply the missing property. In another implementation, the synchronization manager 220 may supply a default data for the property. In another implementation, a component in the cloud resources 215 may be used to supply the missing property. In yet another implementation, the synchronization manager 220 may fail to perform the synchronization and provide an error message.

The implementations above are not intended to be all-inclusive or exhaustive of the various ways that missing properties may be handled. Based on the teachings herein, those skilled in the art may recognize other implementations that may be used without departing from the spirit or scope of aspects of the subject matter described herein.

Figure 3:
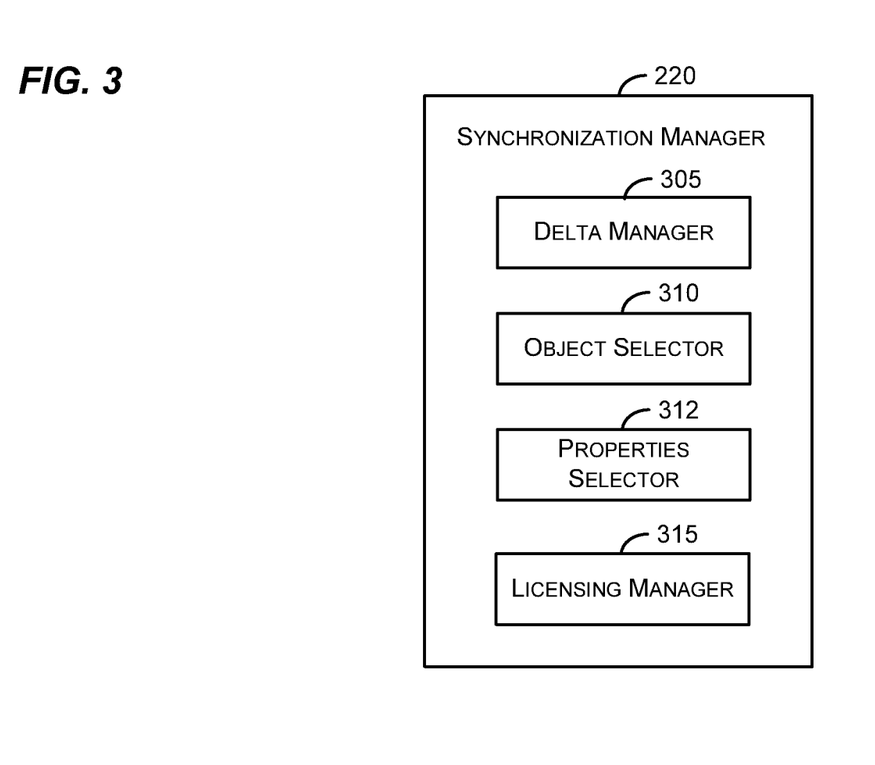
FIG. 3 is a block diagram that illustrates some exemplary components of a synchronization manager in accordance with aspects of the subject matter described herein.

FIG. 3 is a block diagram that illustrates some exemplary components of a synchronization manager in accordance with aspects of the subject matter described herein. The synchronization manager 220 may include a delta manager 305, an object selector 310, a properties selector 312, a licensing manager 315, and other components (not shown).

The delta manager 305 may be operable to determine the properties that have changed in the properties store of the organization since a previous synchronization activity. For example, referring to FIGS. 2 and 3, the delta manager 305 may detect the properties that have changed on the properties store 225 since the last time the synchronization manager 220 synchronized properties from the properties store 225 to the properties store 226. The delta manager 305 may further restrict the detection to only those objects and properties for which synchronization has been indicated.

The object selector 310 may be operable to receive an indication of objects to use to limit the objects to synchronize. The object selector may use the indication to determine objects to use to obtain the properties. For example, the object selector 310 may receive one or more rules that indicate the objects. A rule may state one or more conditions for allowing an object to be included for synchronization. For example, the object selector 310 may receive a rule that indicates that only objects with a home address in the United States are to be synchronized.

The properties selector 312 may be operable to determine properties that are to be synchronized. In one implementation, the properties selector 312 may receive a list of object classes and properties of the object classes that need to be synchronized and may construct therefrom a set of properties that need to be synchronized for eligible objects of the object classes. Eligible objects are those that are not limited by the object selector 310. In another implementation, the properties selector 312 may simply receive a list of properties to synchronize and object classes associated with the properties.

The licensing manager 315 may be operable to track licensed subscribers to services and to create an indication (e.g., a rule, list, or the like) of objects to use to limit the properties to synchronize based on the licensed subscribers to the services.

The delta manager 305, object selector 310, properties selector 312, and licensing manager 315 or portions thereof may, in various embodiments, be hosted on resources of the organization, the cloud resources, externally to the resources of the organization and the cloud resources, a combination of two of more of the above, and the like. Furthermore, in some embodiments, functions of the entities above may be combined in one or more entities, included in other entities (shown or not shown) or placed in sub entities without departing from the spirit or scope of aspects of the subject matter described herein.

Figure 4:
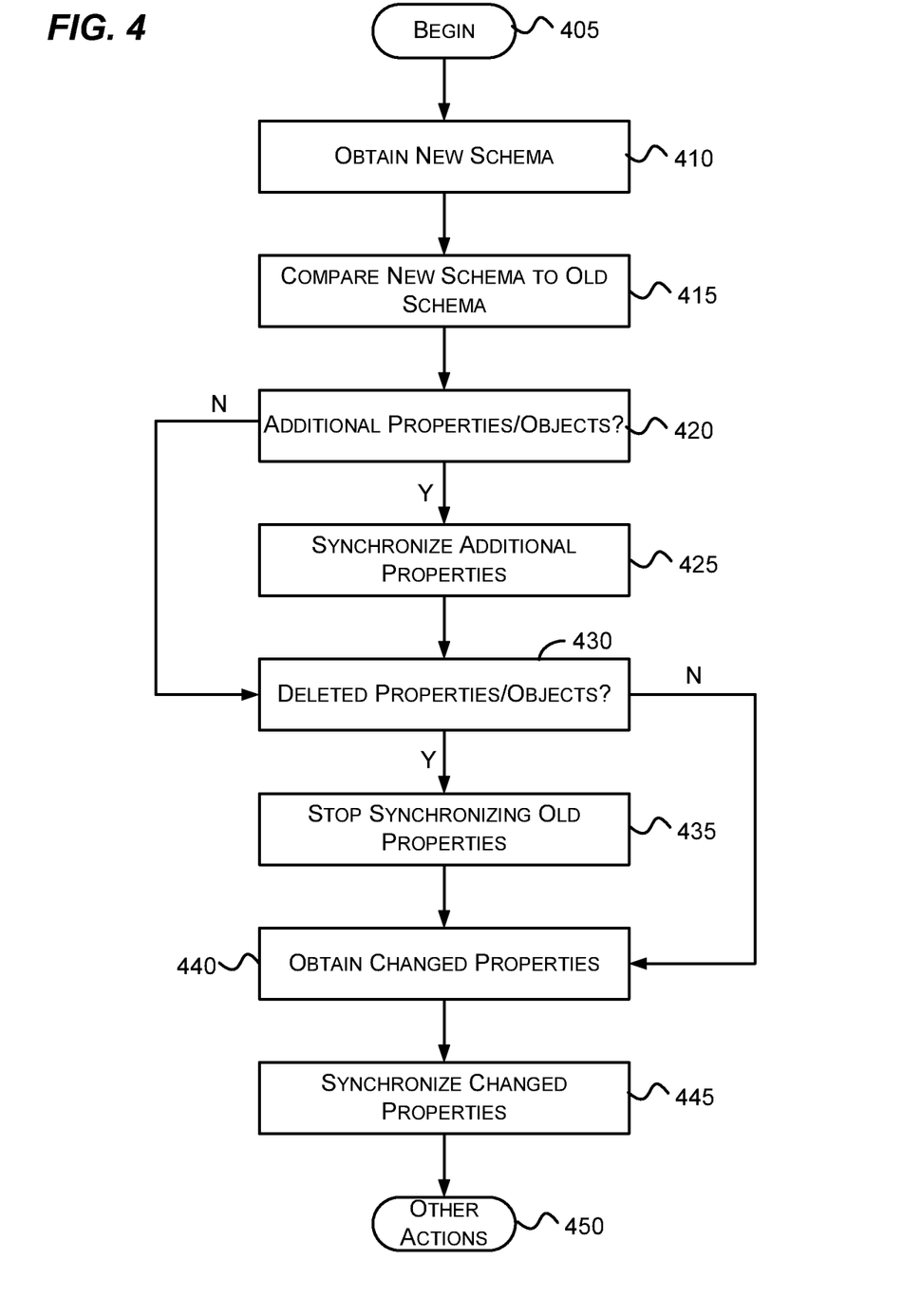
FIGS. 4-5 are flow diagrams that generally represent exemplary actions that may occur in accordance with aspects of the subject matter described herein.
Figure 5:
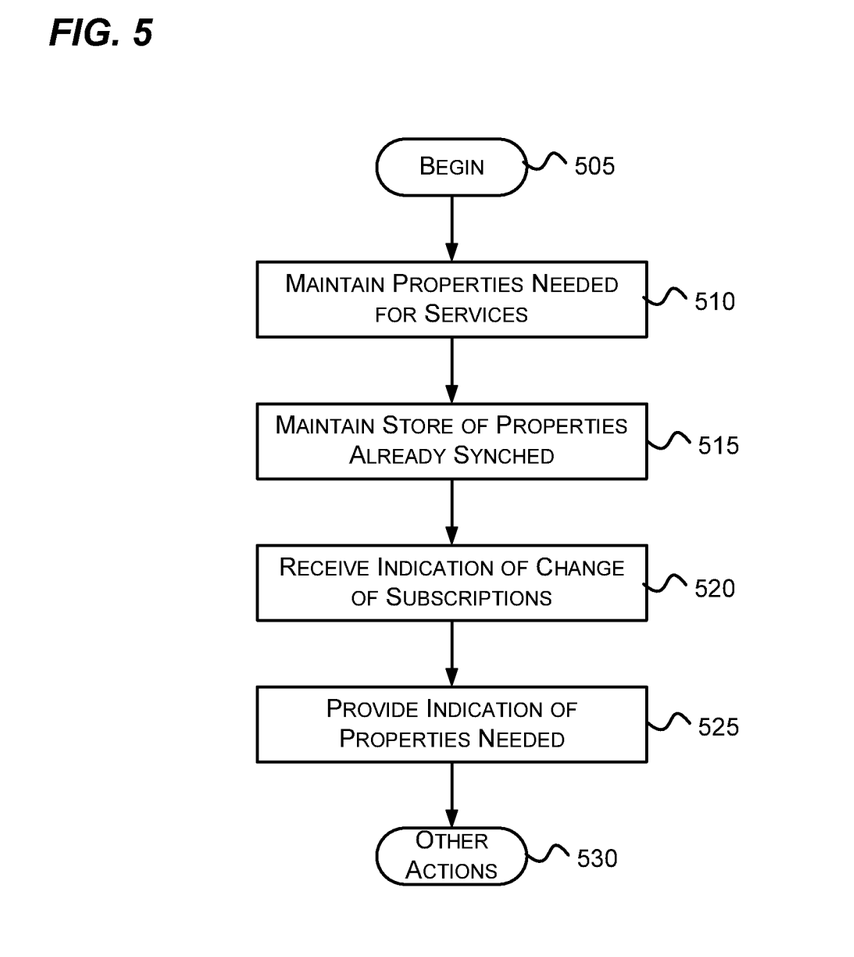

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, a new schema is obtained. As used herein, a schema at a minimum indicates properties to synchronize. A schema may also indicate object classes associated with the properties. A schema may indicate relationships between objects, may include a flat representation of properties to include (e.g., an "inclusion list"), or the like. For example, referring to FIG. 2, the synchronization manager 220 may obtain a schema of properties to synchronize from a component of the cloud resources 215.

At block 415, the new schema is compared to the old schema the synchronization manager used for a previous synchronization. The test is to determine if the new and old schemas indicate the same set of properties to synchronize. For example, referring to FIG. 2, the synchronization manager 220 compares the old and new schemas to determine if they are identical in the sense of indicating the same properties to synchronize.

At block 420, if the new schema includes additional properties to synchronize, the actions continue at block 425; otherwise, the actions continue at block 430. These additional properties may come from additional properties of existing objects that the new schema indicates are to be synchronized and/or as properties of new objects that the schema indicates are to be synchronized.

Alternatively, in addition to the new schema, data may be obtained that indicates objects to use to limit properties to synchronize between the organization properties store and the cloud properties store. For example, a list of objects for which synchronization is sought may be obtained. Properties for objects found in the list may be synchronized while properties for objects not found in the list may not be synchronized. The list may be specified by indicating each object or through the use of one or more rules that, when applied to the organization property store, determine the objects to include. In one implementation, the objects correspond to licensed subscribers of a service.

At block 425, the additional properties are synchronized. For example, referring to FIG. 2, the synchronization manager 220 may iterate over each object currently synchronized and obtain data corresponding to the additional properties from the properties store 225 and send the data to the properties store 226 for synchronization. As another example, the synchronization manager 220 may iterate over each additional object to be synched (e.g., not synched before) and obtain data corresponding to all properties to synchronize for the object from the properties store 225 and send the data to the synchronized to the properties store 226.

At block 430, if the new schema does not include properties/objects of the old schema, the actions continue at block 435; otherwise, the actions continue at block 440.

At block 435, properties that are not included in the new schema that were included in the old schema are no longer synchronized. For example, referring to FIG. 2, if the property cost center of user objects has been deleted in the new schema, this property is no longer synchronized from the properties store 225 to the properties store 226. As another example, if the schema indicates that certain user objects are no longer to be synchronized, the properties of those objects are no longer synchronized from the properties store 225 to the properties store 226.

At block 440, changed properties are obtained. The changed properties are those that have changed since the last synchronization. For example, if an address of a user object has changed and the address is still to be synchronized, the new address is obtained. For example, referring to FIG. 2, when an address property that is synchronized even under the new schema is changed, the synchronization manager 220 obtains the new address from the properties store 225.

At block 445, the changed properties are synchronized. For example, referring to FIG. 2, the synchronization manager 220 sends data corresponding to the changed data obtained at block 440 and sends this data to the properties store 226. In addition, in conjunction with synchronization, if certain objects are no longer being synchronized, a message may be sent explicitly or implicitly to the cloud resources that data for these objects may be deleted from the cloud resources.

At block 450, other actions, if any, may be performed. For example, if the new schema includes additional properties to synchronize, the additional properties may be added to a set of properties to check periodically for changes to synchronize from the organization properties store to the cloud properties store. As another example, if the new schema does not include properties of the old schema, the deleted properties may be removed from the set of properties to periodically check for changes to synchronize from the organization properties store to the second properties store.

Turning to FIG. 5, at block 505, the actions begin. At block 510, properties needed for each service available from a cloud are maintained. For example, referring to FIG. 2, a system administrator (not shown) or the like enters, updates, or deletes properties that are needed for each service available from the cloud resources 215.

At block 515, a service properties store is maintained. Maintaining refers to storing and/or updating the properties included on the properties store of the cloud resources in response to synchronization activities that occur. The properties have been provided by a synchronization manager that obtained the properties from a subscriber properties store of a service subscriber. For example, referring to FIG. 2, a component of the cloud resources 215 maintains the properties store 226.

At block 520, an indication is received of a change in service subscriptions for a service subscriber. A service subscriber is an entity that requests services from the cloud resources. For example, referring to FIG. 2, a component of the cloud resources 215 may receive an indication that an organization wants to subscribe to an e-mail service hosted by the cloud resources 215.

At block 525, an indication is provided of properties that are needed from the service subscriber for the change in service. For example, referring to FIG. 2, the properties store 226 may provide an indication of additional properties that are needed for the addition of the e-mail service.

At block 530, other actions, if any, may be performed. For example, referring to FIG. 2, after a change in service subscriptions, the cloud resources 215 may wait to receive a message that the service subscriber has received an indication of properties that are needed from the service subscriber for the change in service subscriptions and, only after the message is received, delete data in the service properties store that corresponds to properties that were removed from synchronization. For example, if subscription to a service was canceled, the cloud resources 215 may wait until an instruction removing the properties for the service is received from the organization resources 210 and a message is returned that indicates receipt of this instruction. After the message is received, the cloud resources may delete data corresponding to the properties that are no longer to be synchronized.

As another example, if a version has changed of a service hosted by the cloud resources 215, several actions may occur, including:

1. A component of the cloud resources 215 may receive an indication (e.g., via a user or other interface) that the version has changed. For example, a third party vendor may indicate that a version has changed and may provide properties that are needed for the changed version;

2. Data may be obtained that indicates properties that have been added, deleted, and/or changed to synchronize in response to the version changing;

3. For each entity subscribed to the service, an updated data structure (e.g., a table, list, or other data structure) may be generated that indicates a set of properties that need to be provided by the entity, and this data structure or property data derived therefrom, may be provided to the entity, where the property data indicates the set of properties that need to be provided by the entity.

As can be seen from the foregoing detailed description, aspects have been described related to synchronizing data. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. At a computer system, the computer system connected to an organization and a cloud, the organization subscribing to a plurality of services from the cloud, a method for synchronizing data from the organization to the cloud, the method implemented at least in part by the computer system, the method comprising:
   determining that synchronization of data from the organization to the cloud is appropriate due to the organization changing subscriptions to the plurality of services from a prior different plurality of services of the cloud, including:
      obtaining a schema for the plurality of services, the schema defining a set of properties relevant to the plurality of services, the defined set of properties to be synchronized from the organization to the cloud to increase the effectiveness of providing the plurality of services to the organization, the schema obtained by combining one or more properties relevant to each service in the plurality of services into the defined set of properties;
      comparing the schema to a prior schema that was previously obtained, the prior schema defining a prior set of properties relevant to the prior different plurality of services, the prior schema obtained by combining one or more properties relevant to each service in the prior plurality of services into the defined prior set of properties; and
      identifying a difference of at least one relevant property between the plurality of services and the prior different plurality of services based on comparing the schema to the prior schema; and
   synchronizing data for the defined set of properties from the organization to the cloud by performing a set of actions to address the identified difference of at least one relevant property.

2. The method of claim 1, wherein obtaining a schema comprises obtaining a schema that indicates relevant properties are to be synchronized for a limited set of eligible objects, the limited set of eligible objects being a subset of objects of the organization.

3. The method of claim 2, wherein the limited set of eligible objects comprises licensed subscribers to a service, the service selected from among the plurality of services.

4. The method of claim 2, wherein obtaining an indication that the plurality of properties are to be synchronized for a limited set of objects comprises obtaining a rule that defines the limited set of objects; and
   wherein comparing the schema to the prior schema comprises applying the rule on a plurality of objects of the organization to determine which of the plurality of objects satisfy the rule.

5. The method of claim 2, wherein performing the set of actions comprises for each object included in the limited set of objects:
   obtaining data corresponding to the defined set of properties from the organization resources; and
   sending the data to the cloud.

6. The method of claim 1, wherein performing the set of actions comprises for an additional object to be synched from the organization to the cloud, including:
   obtaining data for the defined set of properties for the additional object; and
   sending the data to the cloud.

7. The method of claim 1, wherein identifying a difference of at least one relevant property comprises determining at least one property included in the schema is not included in the prior schema; and
   further comprising adding the at least one property to the defined set of properties to check periodically for changes to synchronize from the organization to the cloud.

8. The method of claim 1, wherein identifying a difference of at least one relevant property comprises determining at least one property included in the prior schema is not included in the schema; and
   further comprising removing the at least one property from the defined set of properties to periodically check for changes to synchronize the organization with the cloud.

9. A computer system, the computer system connected to an organization and a cloud the organization subscribing to a plurality of services for the cloud, the computer system comprising:
   a processor;
   system memory;
   a synchronization manager, the synchronization manager configured to synchronize data from the organization to the cloud including:
      determine that synchronization of data from the organization to the cloud is appropriate due to the organization changing service subscriptions to the plurality of services from a prior different plurality of services of the cloud, including:
         obtain a schema for the plurality of services, the schema defining a set of properties relevant to the plurality of services, the defined set of properties to be synchronized from the organization to the cloud to increase the effectiveness of providing the plurality of services services to the organization, the schema obtained by combining one or more properties relevant to each service in the plurality of services into the defined set of properties;
         compare the schema to a prior schema that was previously obtained, the prior schema defining a prior set of properties relevant to the prior different plurality of services, the prior schema obtained by combining one or more properties relevant to each of the prior plurality of services into the defined prior set of properties; and
         identify a difference of at least one relevant property between the the plurality of services and the prior different plurality of services based on comparing the schema to the prior schema; and
      synchronize data for the defined set of properties from the organization to the cloud by performing a set of actions to address the identified differences of at least one relevant property, synchronizing the defined set of properties increasing the effectiveness of providing the plurality of services to the organization.

10. The computer system of claim 9, wherein the computer system hosts organization resources on a network.

11. The computer system of claim 9, wherein the computer system hosts the plurality of services.

12. The computer system of claim 9, wherein the computer system is external to both the organization and the cloud.

13. The computer system of claim 9, wherein the synchronization manager being configured to synchronize the defined set of properties comprises the synchronization manager being configured to convert between different storage formats at the organization and the cloud.

14. The computer system of claim 9, wherein the synchronization manager comprises an object selector, the object selector configured to: select a limited set of objects, from among a plurality of objects of the organization, for synchronization, the selection in accordance with a rule that defines the limited set of objects.

15. The computer system of claim 14, further comprising a licensing manager, the licensing manager configured to:
track licensed subscribers to the plurality of services; and
create an indication of objects to use to limit the properties to synchronize based on the licensed subscribers to the one or more services.

16. A computer program product for use at a computer system, the computer system connected to an organization and a cloud, the organization subscribing to a plurality of services from the cloud, the computer program product for implementing a method for synchronizing data from the organization to the cloud, the computer program product comprising one or computer storage devices having stored thereon computer-executable instructions that, when executed at a processor, cause the computer system to perform the method including the following:
determine that synchronization of data between the organization and the cloud is appropriate due to the organization changing service subscriptions to the plurality of services from a prior different plurality of services of the cloud, including:
obtain a schema for the plurality of services, the schema defining a set of properties relevant to the plurality of services, the defined set of properties to be synchronized from the organization to the cloud to increase the effectiveness of providing the plurality of services to the organization, the schema obtained by combining one or more properties relevant to each service in the plurality of services into the defined set of properties;
compare the schema to a prior schema that was previously obtained, the prior schema defining a prior set of properties relevant to the prior different plurality of services, the prior schema obtained by combining one or more properties relevant to each of the prior plurality of services into the defined prior set of properties; and
identify a difference of at least one relevant property between the plurality of services and the prior different plurality of services based on comparing the schema to the prior schema; and
synchronize data for the defined set of properties from the organization to the cloud by performing a set of actions to address the identified difference of at least one relevant property, synchronizing the defined set of properties increasing the effectiveness of providing the plurality of services to the organization.

17. The computer program product of claim 16, wherein computer-executable instructions that, when executed, cause the computer system to obtain a schema comprise computer-executable instructions that, when executed, cause the computer system to obtain obtaining a schema that indicates relevant properties are to be synchronized for a limited set of eligible objects, the limited set of eligible objects being a subset of objects of the organization.

18. The computer program product of claim 17, wherein the limited set of eligible objects comprises licensed subscribers to a service, the service selected from among the plurality of services.

19. The computer program product of claim 16, wherein computer-executable instructions that, when executed, cause the computer system to determine that synchronization of data between the organization and the cloud is appropriate comprise computer-executable instructions that, when executed, cause the computer system to determine that synchronization of data between the organization and the cloud is appropriate by detecting that the organization has changed subscriptions to services from among the plurality of services.

20. The computer program product of claim 16, wherein the plurality of services include one or more of: e-mail, document management, reporting, database, calculating, calendaring, scheduling, and instant messaging.

* * * * *